(12) United States Patent
McAlinden et al.

(10) Patent No.: US 8,220,743 B2
(45) Date of Patent: Jul. 17, 2012

(54) AIRCRAFT WING ASSEMBLY

(75) Inventors: Jon McAlinden, Bristol (GB); Simon King, Bristol (GB); Marcella Pizzo, Bristol (GB)

(73) Assignee: Airbus Operations Limited, Bristol (GB)

( * ) Notice: Subject to any disclaimer, the term of this patent is extended or adjusted under 35 U.S.C. 154(b) by 411 days.

(21) Appl. No.: 12/481,267

(22) Filed: Jun. 9, 2009

(65) Prior Publication Data

US 2009/0308981 A1 Dec. 17, 2009

(30) Foreign Application Priority Data

Jun. 11, 2008 (GB) .................................. 0810584.3

(51) Int. Cl.
*B64C 3/00* (2006.01)
(52) U.S. Cl. ................... 244/123.1; 244/123.8; 244/215
(58) Field of Classification Search .......... 244/213–216, 244/123.1, 123.8, 124
See application file for complete search history.

(56) References Cited

U.S. PATENT DOCUMENTS

| 3,655,149 A | * | 4/1972 | Williams | 244/225 |
| 3,785,594 A | | 1/1974 | Lee | |
| 5,884,872 A | * | 3/1999 | Greenhalgh | 244/201 |
| 2008/0042009 A1 | * | 2/2008 | Gartelmann et al. | 244/99.3 |

FOREIGN PATENT DOCUMENTS

GB  1227316  4/1971

OTHER PUBLICATIONS

GB Search Report for GB0810584.3 dated Oct. 8, 2008.

* cited by examiner

*Primary Examiner* — Tien Dinh
*Assistant Examiner* — Jamie S Stehle
(74) *Attorney, Agent, or Firm* — Lowe, Hauptman, Ham & Berner, LLP (57) ABSTRACT

An aircraft wing assembly comprising: a main wing element; an inboard rib and an outboard rib, each mounted to the main wing element; a bridging structure attaching the inboard rib to the outboard rib; an inboard flap and an outboard flap; and an inboard bearing and an outboard bearing, each mounted to the bridging structure and each engaging a respective one of the flaps. The bridging structure ensures that an accurate distance is maintained between the ribs during installation, and maximises the stiffness of the assembly. Also, the bridging structure can act as a shear plate supporting both the inboard and outboard bearings, thus removing any twisting moment on the ribs.

8 Claims, 8 Drawing Sheets

AIRCRAFT WING ASSEMBLY

RELATED APPLICATIONS

The present application is based on, and claims priority from, British Application Number 0810584.3, filed Jun. 11, 2008, the disclosure of which is hereby incorporated by reference herein in its entirety.

FIELD OF THE INVENTION

The present invention relates to an aircraft wing assembly, a fitting suitable for use in such an assembly, and a method of operating such an assembly.

BACKGROUND OF THE INVENTION

In large subsonic passenger aircraft it is commonly necessary to support the flaps firmly and react flap loads when the flaps are in their cruise position.

SUMMARY OF THE INVENTION

A first aspect of the invention provides an aircraft wing assembly comprising: a main wing element; an inboard rib and an outboard rib, each mounted to the main wing element; a bridging structure attaching the inboard rib to the outboard rib; an inboard flap and an outboard flap; and an inboard bearing and an outboard bearing, each mounted to the bridging structure and each engaging a respective one of the flaps.

A second aspect of the invention provides a method of operating the assembly of the first aspect, the method comprising moving the flaps relative to the main wing element from a retracted position to a partially extended position; and engaging the flaps with the bearings as the flaps move.

A third aspect of the invention provides a fitting for transferring load between a pair of flaps and an aircraft wing, the fitting comprising a pair of ribs; a bridging structure attaching the inboard rib to the outboard rib; a first bearing mounted to the bridging structure proximate a first one of the ribs; and a second bearing mounted to the bridging structure proximate a second one of the ribs.

The bridging structure ensures that an accurate distance is maintained between the ribs during installation, and maximises the stiffness of the assembly. Also, the bridging structure can act as a shear plate supporting both the inboard and outboard bearings, thus removing any twisting moment on the ribs.

The bridging structure may be integrally formed as a single piece with the pair of ribs, or formed as a separate part before being attached to the ribs.

The bearings may engage with a structure on or behind the leading edges of the flaps, but more preferably each flap has a projection, such as a curved strake, which extends forward from a leading edge of the flap and engages a respective one of the bearings.

Typically one of the projections extends from an outboard end of the inboard flap, and the other projection extends from an inboard end of the outboard flap.

In the embodiment of the invention described below, the bearings are roller bearings. However, in an alternative embodiment (not shown) the bearings may be sliding bearings with bearing surfaces formed from a low-friction material such as PTFE. In this case the bearing surfaces remain stationary and the flaps move with a sliding action across the bearing surface. Where roller bearings are used then preferably the axes of the roller bearing(s) in the inboard bearing is substantially parallel with the roller bearing(s) in the outboard bearing.

Each bearing may comprise only a single bearing surface (such as a single roller), but more typically each comprises at least two bearing surfaces (such as two rollers), each engaging a respective side (typically upper and lower sides) of a respective one of the projections.

Typically the ribs are attached to a spar of the main wing element. Optionally the ribs may also be attached to one or more covers which are attached to the spar and overhang to its rear. In this case each rib may comprise a continuous web which is attached to both covers; a rib arm attached to one of the covers only; or a first rib arm and a second rib arm, each attached to a respective one of the covers. In the latter case, typically the first rib arm extends longitudinally at an acute angle to the second rib arm.

The inboard rib and outboard rib may converge towards each other as they extend to the rear of the main wing element.

The ribs may have the sole function of supporting the bearings, but more preferably the assembly further comprises an inboard spoiler pivotally attached to the inboard rib, and an outboard spoiler pivotally attached to the outboard rib. This minimizes weight by utilizing existing components (the spoiler ribs) to support the bearings.

Preferably both of the flaps are moved in substantially the same direction, when viewed from above. Typically this is a stream-wise direction in a direction parallel to the direction of airflow as viewed from above.

Preferably an outboard end of the inboard flap is adjacent to an inboard end of the outboard flap, with substantially no structure between them.

Various other preferred features of the invention are set out in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
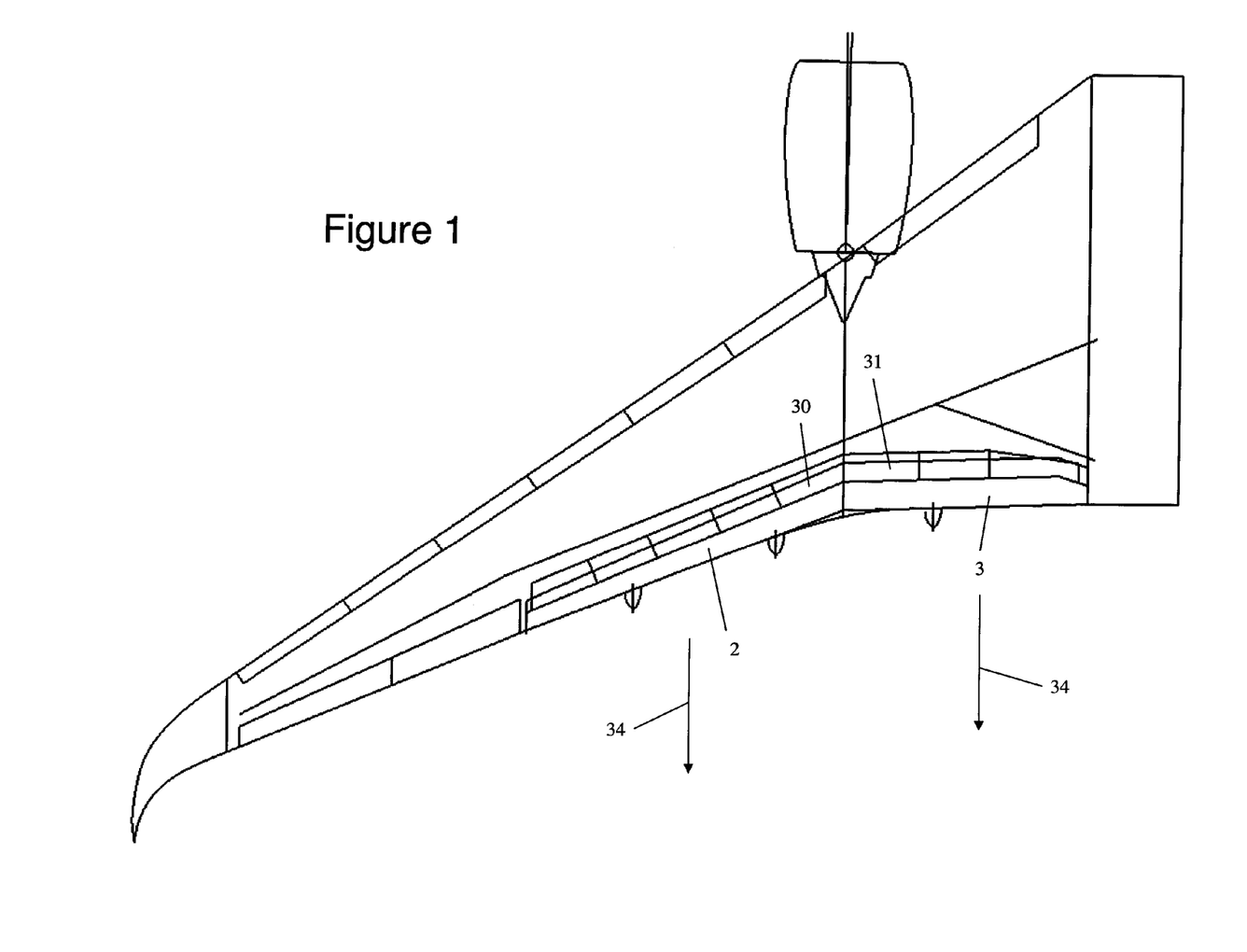
FIG. 1 is a plan view of an aircraft wing.

FIG. 1 is a planform view of the port wing of an aircraft. The wing has a swept outboard flap 2, an un-swept inboard flap 3, and a kink in the trailing edge of the wing where the flaps 2,3 meet.

Figure 2:
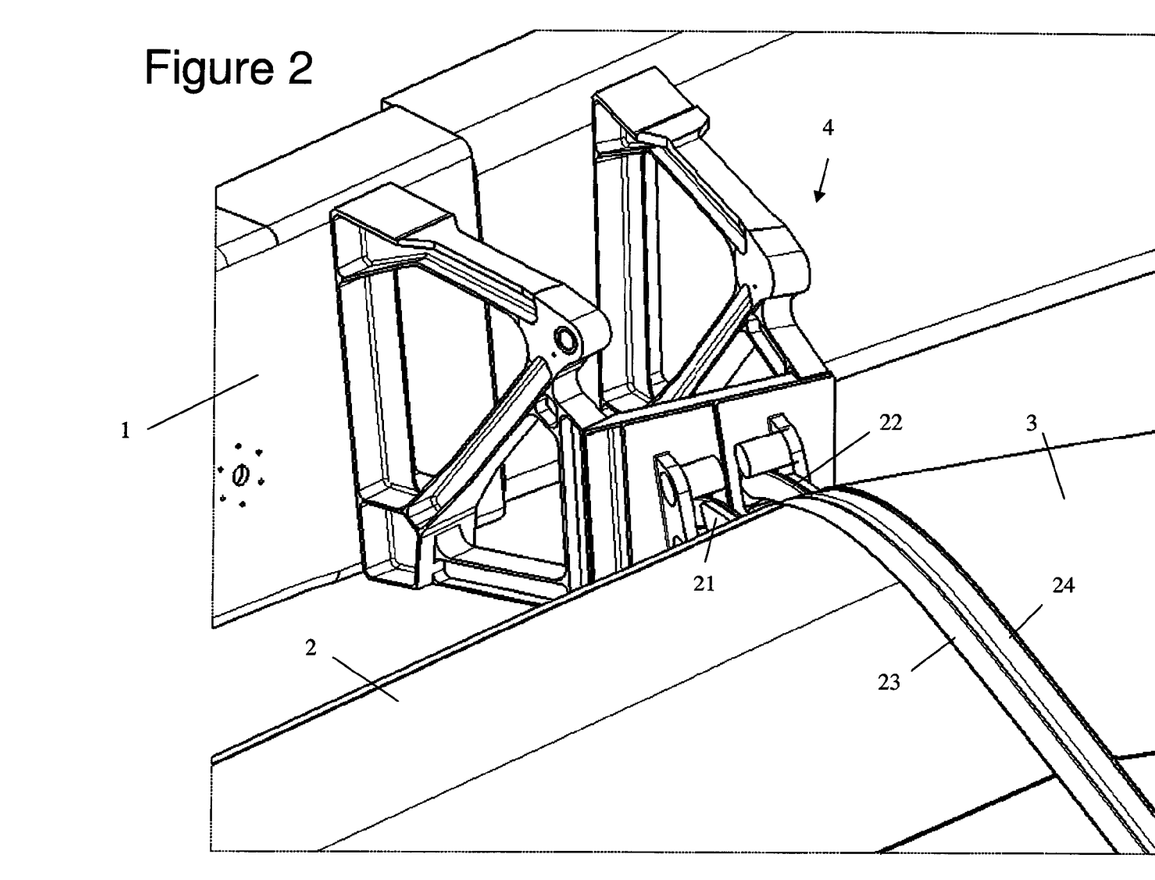
FIG. 2 is a rear perspective view of part of the trailing edge of the wing.

FIG. 2 is a close up view of the trailing edge of the wing at the interface between the flaps 2,3. The flaps 2, 3 are mounted to a rear spar 1 by various drop-link mechanisms (not shown). FIG. 2 shows a fitting 4 for transferring load between the adjacent ends of the flaps and the spar 1 when the flaps are in cruise configurations.

Figure 3:
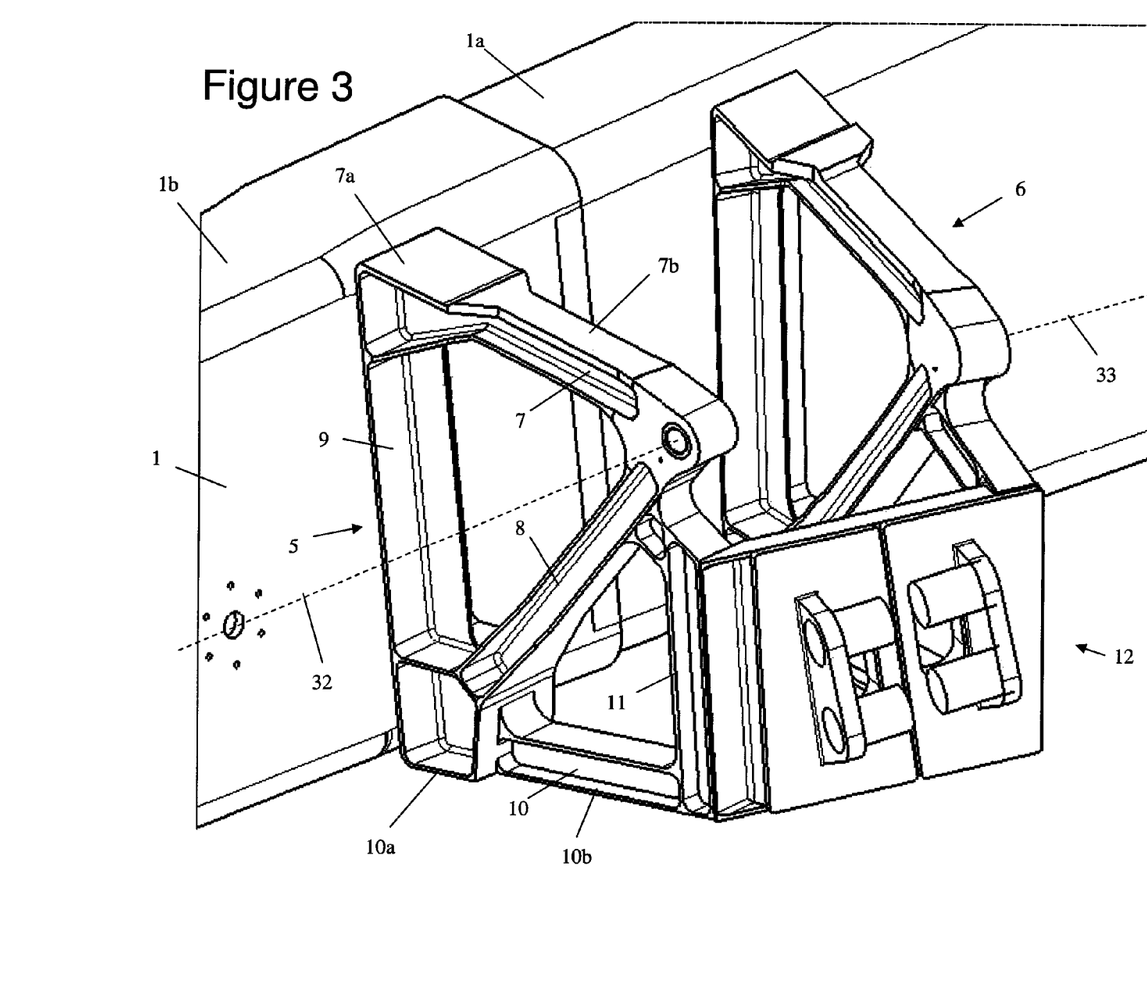
FIG. 3 is a rear perspective view of a fitting and rear spar.

The spar 1 is made of a composite material such as carbon-fibre reinforced epoxy resin. The spar 1 is assembled by joining together an inboard spar member 1a and an outboard spar member 1b with a joint plate (not shown) as shown in FIG. 3. There is a small step where the spar members 1a,1b meet.

The fitting 4 is shown in FIG. 3, and comprises an outboard rib 5 and an inboard rib 6. Each rib 5,6 is identical so only the outboard rib 5 will be described in detail. The rib 5 comprises a forward A-frame which is mounted to the main wing element; and a rear A-frame which is mounted to the forward A-frame.

The forward A-frame comprises an upper rib arm 7; an angled rib arm 8 which extends down at an acute angle to the upper rib arm 7; and a vertical forward arm 9 which is bolted to the web of the spar 1.

The rear A-frame comprises a lower rib arm 10 and a rear arm 11 which extends up to join the lower rib arm 10 to the angled rib arm 8. The rear arm 11 defines the rear (distal) end of the rib 5.

Upper and lower covers (not shown) are attached to the spar and overhang to its rear. The upper rib arm 7 has a pair of flanges 7a which are bolted to the upper cover, and the lower rib arm 10 has a pair of flanges 10a which are bolted to the lower cover. Removable upper and lower panels (also not shown) are bolted to flanges 7b of the upper rib arm 7 and flanges 10b of the lower arm 10. In an alternative arrangement the forward arm 9 of the forward A-frame may be omitted, particularly if the rear spar is not formed from a composite material.

Figure 4:
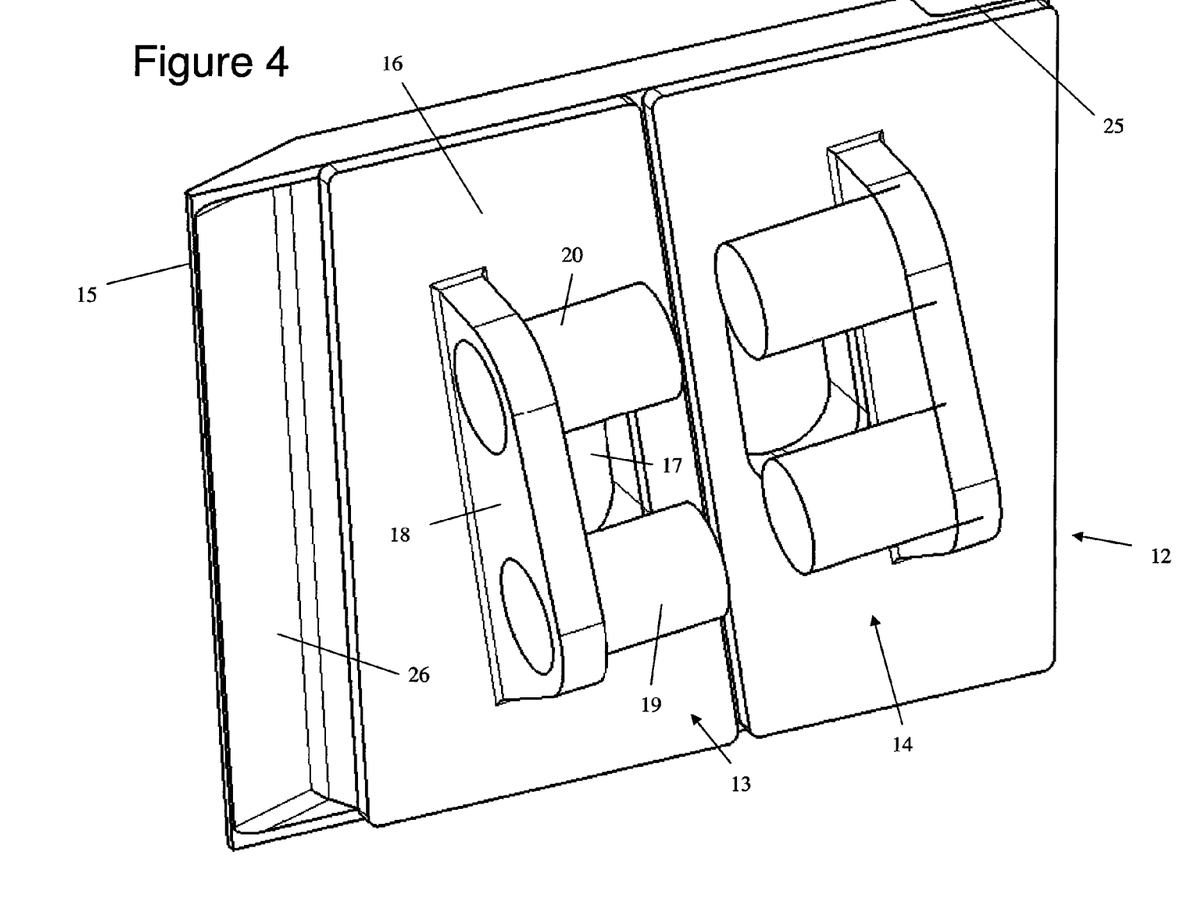
FIG. 4 is a rear perspective view of a bridging structure.
Figure 5:
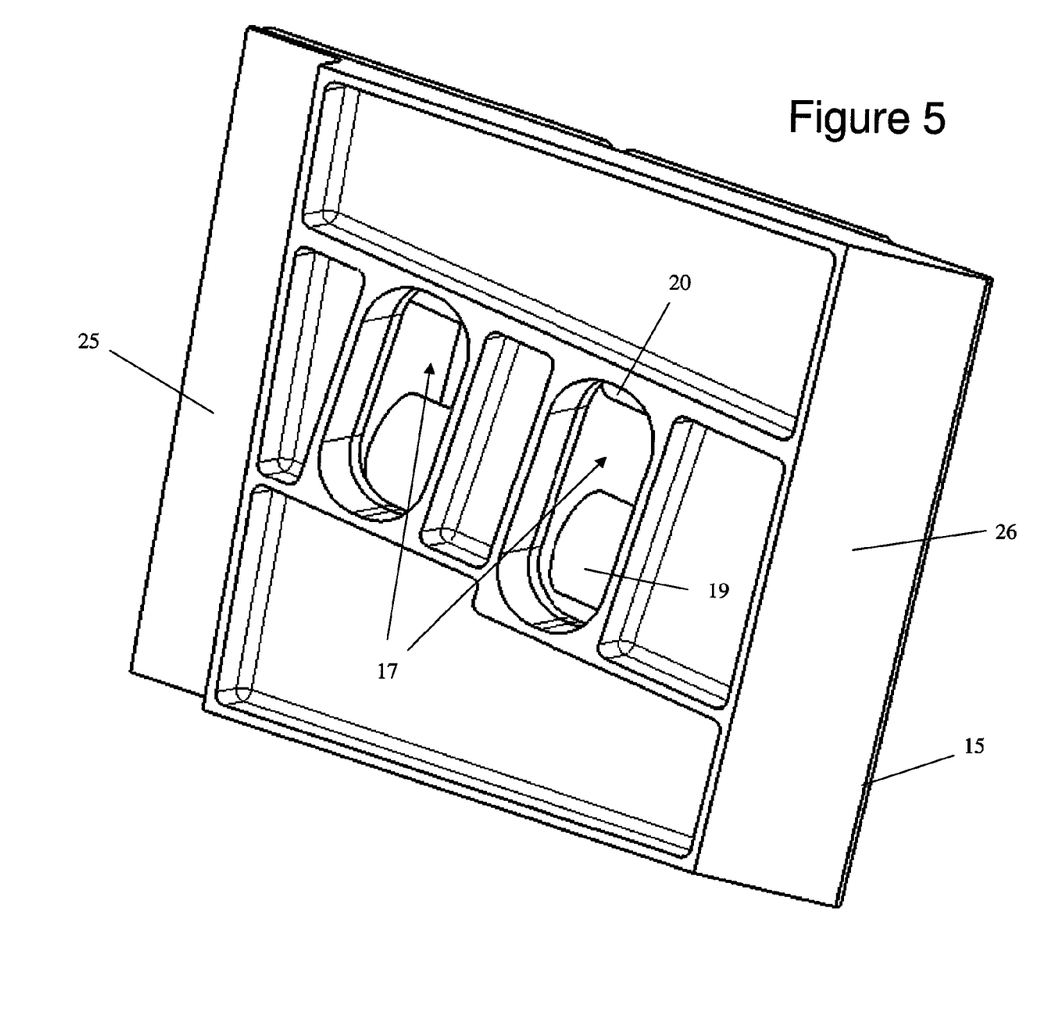
FIG. 5 is a front perspective view of the bridging structure.
Figure 6:
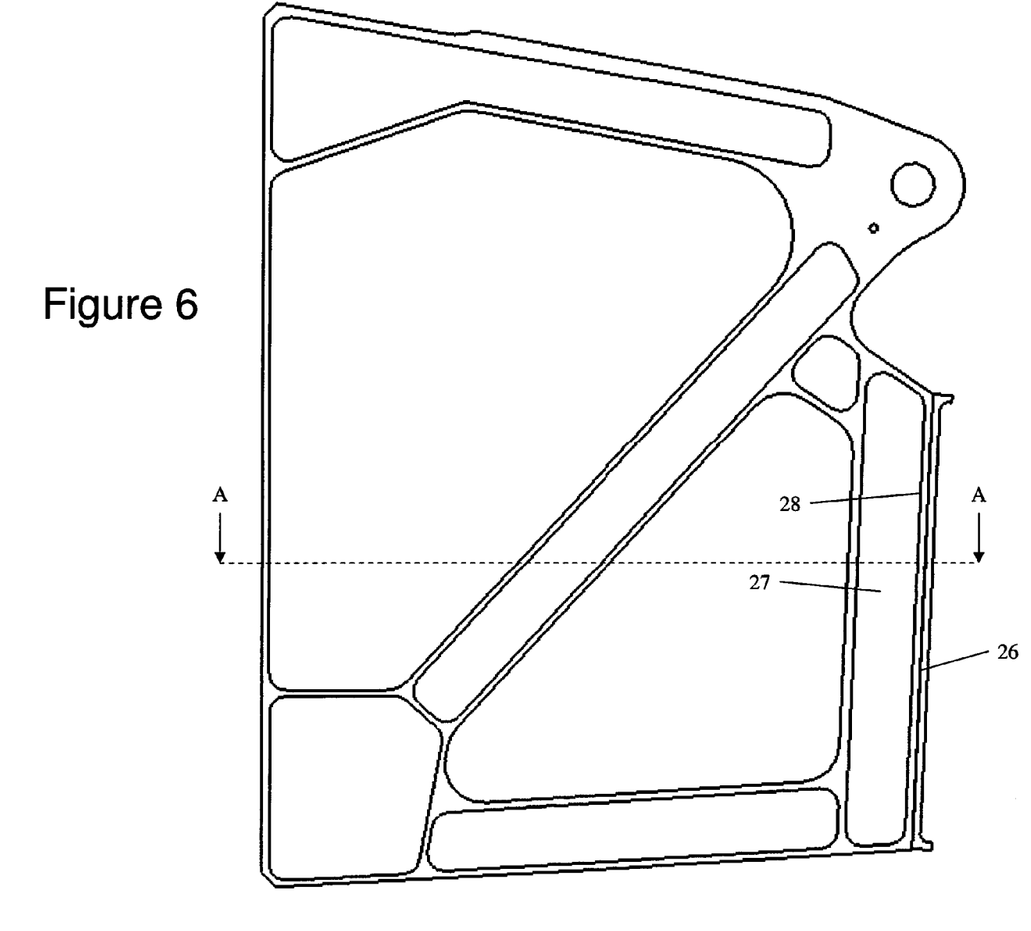
FIG. 6 is a side view of the fitting.

A bridging structure 12 is bolted to the rear arms 11 of the ribs 5,6, and is shown in detail in FIGS. 4 and 5. The bridging structure 12 comprises a pair of roller-bearing assemblies 13,14 each mounted to a frame 15 and each being proximate a respective one of the ribs 5,6. The roller-bearing assemblies are identical so only the outboard assembly 13 will be described. The assembly 13 comprises a plate 16 with a hole 17. A rib 18 is attached to the plate and carries a pair of rollers 19,20 on opposite sides of the hole 17. By mounting each roller bearing on a different plate, the plates can be moved independently up and down relative to the frame 15 before they are bolted to it. Optionally the plates 16 may be serrated where they meet, enabling a series of indexed positions.

The axes of the inboard and outboard rollers are substantially parallel with each other. However the rollers have axes of rotation which can be adjusted in order to position them correctly relative to the holes 17.

FIG. 5 is a front perspective view of the bridging structure 12. The frame 15 has an inboard pillar 25 which lies parallel with the plate 16, and an outboard pillar 26 which lies at an angle of approximately 23° to the plate 16. This enables the bridging structure 12 to accommodate the convergence between the inboard rib and outboard rib as they extend to the rear of the spar—the angle of convergence being shown most clearly in FIG. 7.

Figure 7:
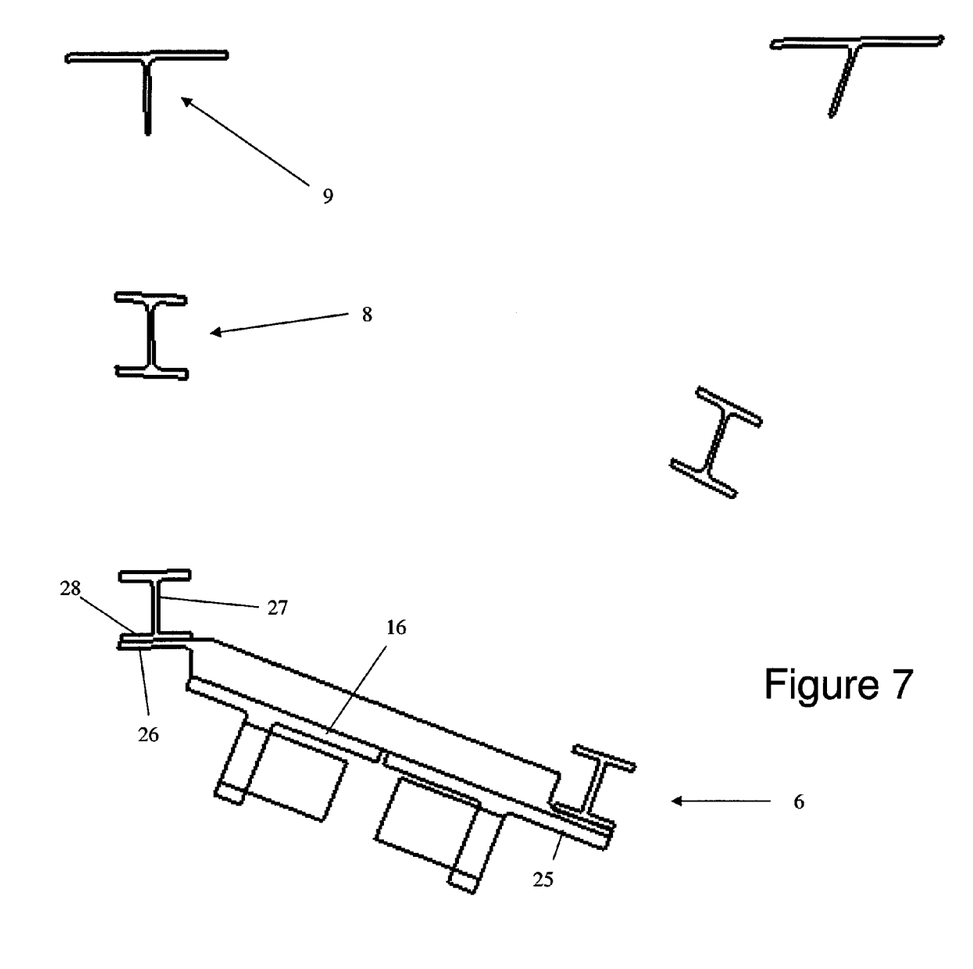
FIG. 7 is a cross-section taken along a line A-A in FIG. 6.

The front arm 9 of the A-frame is T-shaped in section, and the arms 7,8,10,11 of the A-frame are H-shaped in section. As shown in FIG. 7 the arm 11 has a web 27 and flanges 28. The flanges 28 are bolted to the outboard pillar 26, and the flanges of the rear arm (not labelled) of the inboard rib 6 are bolted to the inboard pillar 25.

Returning to FIG. 2, each flap 2,3 has a strake 21,22 which extends forward from a leading edge of the flap and engages a respective one of the roller-bearings.

Figure 8:
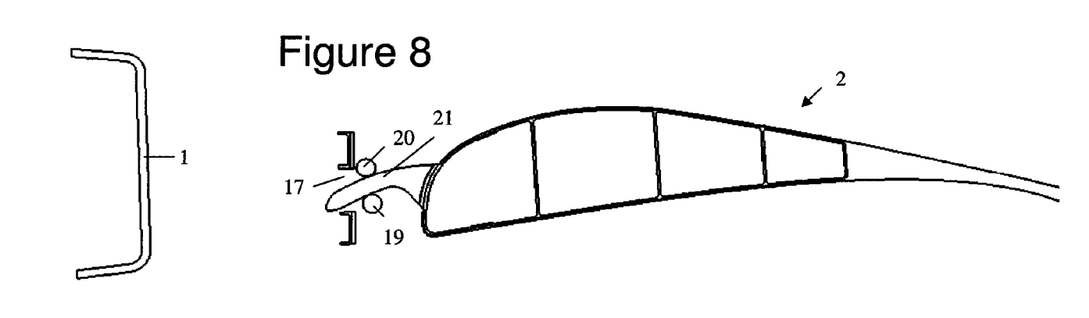
FIG. 8 shows the outboard flap in its 0° position.
Figure 9:
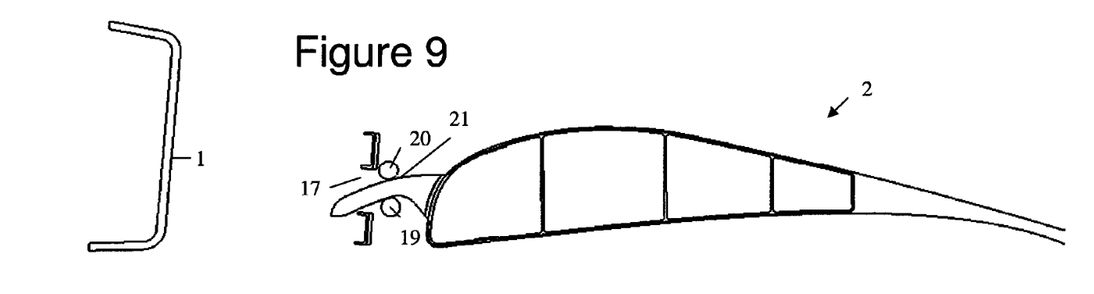
FIG. 9 shows the outboard flap in its −2° position.
Figure 10:
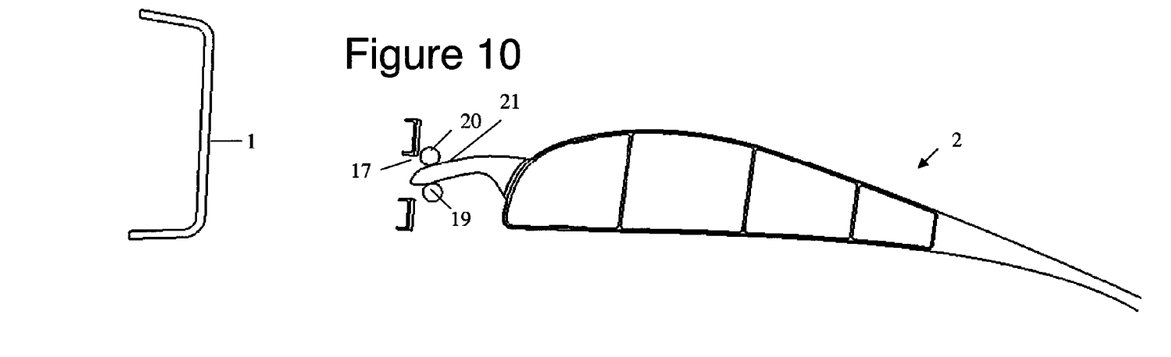
FIG. 10 shows the outboard flap in its +4° position.

FIG. 8 shows the outboard flap 2 in its 0° position—that is, an intermediate position in which the flap is partially deployed and oriented at 0° relative to the spar 1. FIG. 9 shows the flap in its −2° position—that is, a position in which the flap is fully retracted and oriented at −2° relative to the spar 1. FIG. 10 shows the flap in its +4° position—that is, a position in which the flap is partially deployed and oriented at +4° relative to the spar 1. The flaps 2,3 are each mounted to the spar by respective drop-hinge mechanisms (not shown) and can be deployed independently by respective actuators (also not shown) between +4° and −2° during cruise of the aircraft in order to trim the camber of the wing and minimise fuel burn. As shown in FIGS. 8-10, each roller 19,20 engages a respective side of the strake 21 and rotates as the flap moves between its various positions and the strake moves in and out of the hole 17. The strake 21 has a curved shape designed to accommodate the stream-wise drop-hinge motion of the flap.

The roller-bearings hold the strakes rigidly and hence keeps the leading edges of the flaps in their desired positions during cruise conditions. However the flaps can be deployed to angles higher than +4° during take off and landing, but as they move to these highly cambered configurations the strakes disengage from the roller bearings.

Returning to FIG. 1, the inboard portion of the wing has spoilers forward of the inboard flap 3, and the outboard portion has spoilers forward of the outboard flap 2. Two adjacent ones of the spoilers are labelled 30 and 31 in FIG. 1. As well as transferring load from the flaps 2,3 into the spar, the ribs 5,6 also provide a hinged connection between the spoilers 30,31 and the spar 1. The hinges are formed at the junction between the arms 7,8. The axes of the spoiler hinges are indicated by dashed lines 32,33 in FIG. 3.

Both flaps 2,3 are deployed in a stream-wise sense. That is, they deploy in a direction parallel to the direction of airflow and the length of the aircraft as viewed from above. This stream-wise direction is indicated by arrows 34 in FIG. 1. Because both flaps deploy in the same stream-wise direction, the outboard end rib 23 of the inboard flap 2 and the inboard end rib 24 of the outboard flap 3 can meet, with substantially no structure between them (although there will be a small gap between them).

As the flaps 2,3 are close together during cruise conditions, there is no way of getting access to the end ribs 23,24 of the flaps for brackets on the wing structure to engage with rollers on the flap ribs or vice-versa. Therefore it is necessary to use the strakes 21,22 which project from the leading edges of the flaps.

The rollers react the flap loads during cruise and allow the flaps to follow the wing bending during cruise and maintain cruise shape for aerodynamic performance. The loads act in a direction perpendicular to the roller axis passing through the mid point of contact between the roller and the strake. Such loads are offset from the planes of the ribs 5,6. If the bridging structure 12 was removed and the rollers mounted directly onto the ribs 5,6, this offset would introduce a twisting moment on the ribs 5,6, the magnitude of the moment depending on the amount of offset. The bridging structure 12 acts as a shear plate supporting both the inboard and outboard roller-bearings, thus remove the twisting moment. The vertical load introduced by the strake is reacted as shear in the bridging structure 12 and as a vertical reaction in the plane of the ribs 5,6. It is believed that this is an effective way of reacting and distributing the load.

The optimum position for the strakes 21,22 is for them to be in line with the end ribs 23,24 of the flaps, so that they can efficiently transfer load to and from the flaps. The position where the flaps meet is between the spoiler ribs 5,6. For these positions to be achieved, the rollers need to be offset by some distance from the ribs 5,6. Therefore the bridging structure 12 allows the strakes to be in the most efficient position for the flaps. Note that it would not be possible to position either of the ribs 5,6 any closer to the joint between the spar member 1a,1b since they would then interfere with the joint plate (not shown) which joins the members 1a,1b together.

Although the invention has been described above with reference to one or more preferred embodiments, it will be appreciated that various changes or modifications may be made without departing from the scope of the invention as defined in the appended claims.

The invention claimed is:

1. An aircraft wing assembly comprising:
   a. a main wing element;
   b. an inboard rib and an outboard rib, each mounted to the main wing element;
   c. a bridging structure attaching the inboard rib to the outboard rib;
   d. an inboard flap and an outboard flap; and
   e. an inboard bearing and an outboard bearing, each directly mounted to the bridging structure and each directly engaging a respective one of the flaps, wherein the bearings are roller bearings.

2. The assembly of claim 1 wherein each flap has a projection which extends forward from a leading edge of the flap and engages a respective one of the bearings.

3. The assembly of claim 2 wherein one of the projections extends from an outboard end of the inboard flap, and the other projection extends from an inboard end of the outboard flap.

4. The assembly of claim 1 wherein the inboard rib and outboard rib converge towards each other as they extend to the rear of the main wing element.

5. The assembly of claim 1 wherein each rib comprises an A-frame which is mounted to the main wing element, the A-frame comprising a pair of arms which extend at an angle to each other.

6. The assembly of claim 1 wherein each rib comprises:
   a. a forward A-frame which is mounted to the main wing element, the forward A-frame comprising a pair of arms which extend at an angle to each other; and
   b. a rear A-frame which is mounted to the forward A-frame, the rear A-frame comprising a pair of arms which extend at an angle to each other, and wherein the bridging structure attaches the rear A-frame of the inboard rib to the rear A-frame of the outboard rib.

7. The assembly of claim 1 further comprising an inboard spoiler pivotally attached to the inboard rib, and an outboard spoiler pivotally attached to the outboard rib.

8. The assembly of claim 1 wherein the main wing element comprises a rear spar assembly comprising an inboard spar member joined to an outboard spar member, and wherein the inboard and outboard ribs are attached to the inboard and outboard spar members respectively.

* * * * *